US012570310B2

(12) United States Patent
Heitzmann

(10) Patent No.: US 12,570,310 B2
(45) Date of Patent: Mar. 10, 2026

(54) SYSTEMS AND METHODS OF CONTROLLING A VEHICLE BASED ON A DETERMINATION THAT ANOTHER VEHICLE INTENDS TO PARK

(71) Applicant: Valeo Schalter und Sensoren GmbH, Bietigheim-Bissingen (DE)

(72) Inventor: Thomas Heitzmann, Bietigheim-Bissingen (DE)

(73) Assignee: Valeo Schalter und Sensoren GmbH (DE)

( * ) Notice: Subject to any disclaimer, the term of this patent is extended or adjusted under 35 U.S.C. 154(b) by 161 days.

(21) Appl. No.: 18/378,457

(22) Filed: Oct. 10, 2023

(65) Prior Publication Data
US 2025/0115269 A1     Apr. 10, 2025

(51) Int. Cl.
*G06V 20/58* (2022.01)
*B60W 30/18* (2012.01)
(Continued)

(52) U.S. Cl.
CPC .... *B60W 60/001* (2020.02); *B60W 30/18163* (2013.01); *G06V 10/764* (2022.01);
(Continued)

(58) Field of Classification Search
CPC ......... B60W 60/001; B60W 30/18163; B60W 2554/4041; B60W 2554/4045;
(Continued)

(56) References Cited

U.S. PATENT DOCUMENTS 8,378,850 B2   2/2013 Toledo et al.
2021/0237717 A1*  8/2021 Zhang ................... B60W 30/06
(Continued)

FOREIGN PATENT DOCUMENTS

CN       110588637 A    12/2019
DE   102014223744 A1 *  5/2016  ............. G08G 1/165
(Continued)

OTHER PUBLICATIONS

Nakayama Satoshi, Aug. 30, 2023, English Machine Translation_ WO-2025047161-A1 provided by Patent Translate by EPO and Google (Year: 2023).*

(Continued)

*Primary Examiner* — Ashley L Redhead, Jr.
(74) *Attorney, Agent, or Firm* — Dickinson Wright PLLC

(57) ABSTRACT

Methods and systems for autonomously controlling a first vehicle with a forward vehicle intends to park. An image sensor is mounted to the first vehicle and is configured to generate image data associated with a scene surrounding the first vehicle, wherein the scene includes the forward vehicle located ahead of the first vehicle. A processor is mounted to the first vehicle and communicatively coupled to the image sensor. The processor is programmed to process the image data to identify a plurality of parking spaces, a first roadway lane adjacent to the plurality of parking spaces, and a second roadway lane adjacent to the first roadway lane. The processor determines a speed of the forward vehicle, and classifies the forward vehicle as intending to park based on sensed conditions. In response to the forward vehicle being classified as intending to park, the processor issues commands to maneuver the vehicle accordingly.

20 Claims, 10 Drawing Sheets

100

(51) Int. Cl.
  *B60W 60/00* (2020.01)
  *G06V 10/764* (2022.01)

(52) U.S. Cl.
  CPC ... *G06V 20/586* (2022.01); *B60W 2554/4041* (2020.02); *B60W 2554/4045* (2020.02)

(58) Field of Classification Search
  CPC .. G06V 10/764; G06V 20/586; B62D 15/027; B62D 15/025; G08G 1/168
  See application file for complete search history.

(56) References Cited

U.S. PATENT DOCUMENTS

| | | | |
|---|---|---|---|
| 2023/0055038 A1* | 2/2023 | Omi | B60W 30/06 |
| 2023/0118619 A1* | 4/2023 | Horihata | G06T 7/70 |
| | | | 340/937 |
| 2023/0219598 A1* | 7/2023 | Yoon | B60K 35/215 |
| | | | 701/25 |
| 2023/0286495 A1* | 9/2023 | Nakashima | B60W 50/14 |
| 2023/0291024 A1* | 9/2023 | Niizuma | H01M 10/6571 |
| 2024/0104762 A1* | 3/2024 | Murakami | G08G 1/16 |

FOREIGN PATENT DOCUMENTS

| | | | |
|---|---|---|---|
| DE | 102015208697 A1 * | 11/2016 | |
| EP | 3886075 A1 | 9/2021 | |
| JP | 2019008506 A * | 1/2019 | |
| WO | WO-2023067793 A1 * | 4/2023 | |
| WO | WO-2025047161 A1 * | 3/2025 | |

OTHER PUBLICATIONS

Hayakawa Yasuhisa, Oct. 22, 2021, English Machine Translation_ WO-2023067793-A1 provided by Patent Translate by EPO and Google (Year: 2021).*

Behrens Alexander, Nov. 20, 2014, English Machine Translation_ DE-102014223744-A1 provided by Patent Translate by EPO and Google (Year: 2014).*

Bogner Fabian, May 11, 2015, English Machine Translation_ DE102015208697 provided by Patent Translate by EPO and Google (Year: 2015).*

Akita A, Jan. 17, 2019, English Machine Translation_JP-2019008506-A provided by Patent Translate by EPO and Google (Year: 2019).*

International Search Report and Written Opinion for PCT/EP2024/ 076835, Completed Dec. 5, 2024, Mailing date of Jan. 17, 2025, All together 16 Pages.

* cited by examiner

SYSTEMS AND METHODS OF CONTROLLING A VEHICLE BASED ON A DETERMINATION THAT ANOTHER VEHICLE INTENDS TO PARK

TECHNICAL FIELD

The present disclosure relates to systems and methods of controlling a first vehicle based on a determination that another vehicle (e.g., a forward vehicle located in front of the first vehicle) intends to park.

BACKGROUND

Autonomous driving in a dense urban environment can be a complicated task. In some situations, the vehicle performing the autonomous or semi-autonomous functions (an EGO vehicle) might approach another vehicle that is trying to park. Even if maintaining a safe distance from the other vehicle, the EGO vehicle might approach close enough to the other vehicle so as to impede on the other vehicle's ability to park. This is because the EGO vehicle cannot appreciate or recognize that the other vehicle is attempting to park by reversing into a parking spot.

SUMMARY

In one embodiment, a system for autonomously controlling a first vehicle when a forward vehicle intends to park is provided. The system includes an image sensor mounted to the first vehicle and configured to generate image data associated with a scene surrounding the first vehicle, wherein the scene includes the forward vehicle located ahead of the first vehicle. The system includes a processor mounted to the first vehicle and communicatively coupled to the image sensor. The processor is programmed to: process the image data to identify a plurality of parking spaces, a first roadway lane adjacent to the plurality of parking spaces, and a second roadway lane adjacent to the first roadway lane; process the image data to determine a speed of the forward vehicle; classify the forward vehicle as having an intention to park based upon at least (1) the forward vehicle traveling in the first roadway lane and (2) the speed of the forward vehicle being less than a speed threshold; and cause the first vehicle to maneuver out of the first roadway lane and into the second roadway lane in response to the forward vehicle being classified as having the intention to park.

In another embodiment, a system for autonomously controlling a first vehicle when a forward vehicle intends to park is provided. The system includes an image sensor mounted to the first vehicle and configured to generate image data associated with a scene surrounding the first vehicle, wherein the scene includes the forward vehicle located ahead of the first vehicle. The system includes a processor mounted to the first vehicle and communicatively coupled to the image sensor. The processor is programmed to: process the image data to identify a plurality of parking spaces, a first roadway lane adjacent to the plurality of parking spaces, and a second roadway lane adjacent to the first roadway lane, wherein one of the plurality of parking spaces is identified as an available parking space; process the image data to determine a speed of the forward vehicle; classify the forward vehicle as having an intention to park based upon at least (1) the forward vehicle traveling in the first roadway lane and (2) the speed of the forward vehicle being less than a speed threshold; and cause the first vehicle to stop before reaching the available parking space based upon the forward vehicle being classified as having the intention to park.

In another embodiment, a method for autonomously controlling a first vehicle when a forward vehicle intends to park is provided. The method includes receiving image data from an image sensor mounted on a first vehicle, wherein the image data is associated with a scene surrounding the first vehicle, and wherein the scene includes the forward vehicle located ahead of the first vehicle; processing the image data to identify a plurality of parking spaces, a first roadway lane adjacent to the plurality of parking spaces, and a second roadway lane adjacent to the first roadway lane; determining a speed of the forward vehicle based on the image data; classifying the forward vehicle as having an intention to park based upon at least (1) the forward vehicle traveling in the first roadway lane and (2) the speed of the forward vehicle being less than a speed threshold; and maneuvering autonomously the first vehicle out of the first roadway lane and into the second roadway lane in response to the first vehicle being classified as having the intention to park.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

"A", "an", and "the" as used herein refers to both singular and plural referents unless the context clearly dictates otherwise. By way of example, "a processor" programmed to perform various functions refers to one processor programmed to perform each and every function, or more than one processor collectively programmed to perform each of the various functions.

Figure 1:
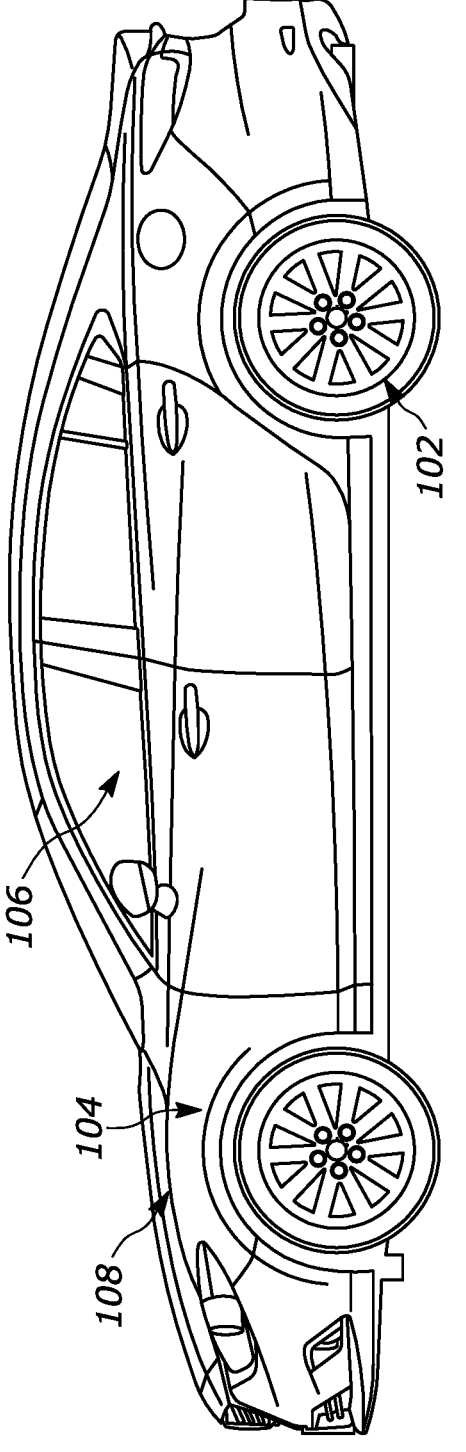
FIG. 1 illustrates an embodiment of a vehicle according to the principles of the present disclosure.

FIG. 1 generally illustrates a vehicle 100 according to an embodiment of the present disclosure. The vehicle 100 may be any suitable vehicle, such as a car, a truck, a sport utility vehicle, a mini-van, a crossover, any other passenger vehicle, any suitable commercial vehicle, or any other suitable vehicle. While the vehicle 100 is illustrated as a passenger vehicle having wheels 102 and for use on roads, the principles of the present disclosure may apply to other vehicles, such as planes, boats, trains, drones, or other suitable vehicles. The vehicle 100 may include any level of automation, such that the vehicle 100 may comprise no automation or may comprise a semi-autonomous vehicle or autonomous vehicle.

The vehicle 100 may include a vehicle body 104 and a passenger compartment 106 at least partially defined by the vehicle body 104. The vehicle 100 may also include an engine compartment 108 under a hood, for example. In some embodiments, the engine compartment 108 may be disposed on a rearward portion of the vehicle 100 rather than the forward portion as illustrated. The engine compartment 108 may include any suitable propulsion system including an internal combustion engine, one or more electric motors (e.g., an electric vehicle), one or more fuel cells, a hybrid (e.g., a hybrid vehicle) propulsion system comprising a combination of an internal combustion engine, one or more electric motors, and/or any other suitable propulsion system.

In some embodiments, the vehicle 100 may include a petrol or gasoline fuel engine, such as a spark ignition engine. In some embodiments, the vehicle 100 may include a diesel fuel engine, such as a compression ignition engine. Additionally, or alternatively, propulsion controls, such as an accelerator actuator (e.g., an accelerator pedal), a brake actuator (e.g., a brake pedal), a steering wheel, and other such components are disposed in the passenger compartment 106. The propulsion controls may be actuated or controlled by a driver of the vehicle 100 and may be directly connected to corresponding components of the propulsion system, such as a throttle, a brake, a vehicle axle, a vehicle transmission, and the like, respectively. Additionally or alternatively, the propulsion controls may be actuated automatically or at least partially automatically by way of an autonomous driving system. For example, the propulsion controls may be actuated automatically via an adaptive cruise control (ACC) system. The vehicle 100 may be a fully-autonomous vehicle capable of propelling and maneuvering itself without human intervention, or the vehicle 100 may be a partially-autonomous vehicle that can perform some actions without human intervention (e.g., parking, accelerating, decelerating, ACC) but requires some human intervention for other actions.

In some embodiments, the vehicle 100 includes a transmission that may include a manual transmission, an automatic transmission, and the like. The vehicle 100 may include one or more pistons, in the case of an internal combustion engine or a hybrid vehicle, which cooperatively operate with a crankshaft to generate force, which is translated through the transmission to one or more axles, which turns wheels 102. When the vehicle 100 includes one or more electric motors, one or more vehicle batteries and/or one or more fuel cells provide energy to the electric motors to turn the wheels 102.

In some embodiments, the vehicle 100 may include a suitable communication network, such as a controller area network (CAN) comprising a CAN bus or other suitable networks or communication systems, or a combination thereof to communicate various information from, for example, sensors within or external to the vehicle, to, for example, various processors or controllers within or external to the vehicle. The vehicle 100 may include additional or fewer features than those generally illustrated and/or disclosed herein.

Figure 2:
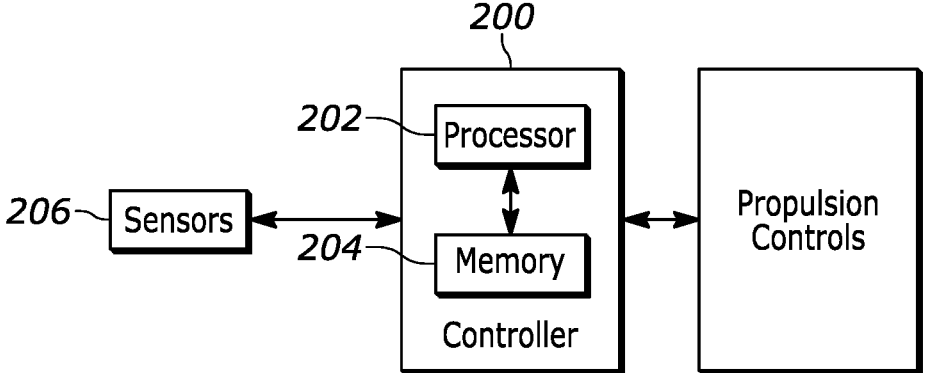
FIG. 2 illustrates an embodiment of a vehicle controller according to the principles of the present disclosure.

In some embodiments, the vehicle 100 includes a controller, such as controller 200 as generally illustrated in FIG. 2. The controller 200 may be configured to control, for example, the various functions of the vehicle systems described herein. For example, the controller 200 may be configured to maneuver (e.g., steer, accelerate, decelerate) the vehicle based upon the sensed environment outside of the vehicle 100, as will be described further herein. The controller 200 may include a processor 202 and a memory 204. The processor 202 may include any suitable processor, such as those described herein. Additionally, or alternatively, the controller 200 may include any suitable number of processors, in addition to or other than the processor 202. The memory 204 may comprise a single disk or a plurality of disks (e.g., hard drives), and includes a storage management module that manages one or more partitions within the memory 204. In some embodiments, memory 204 may include flash memory, semiconductor (solid state) memory or the like. The memory 204 may include Random Access Memory (RAM), a Read-Only Memory (ROM), or a combination thereof. The memory 204 may include instructions that, when executed by the processor 202, cause the processor 202 to, at least, control the propulsion controls 208 of the vehicle such as steering the vehicle, accelerating or decelerating the vehicle, and/or any other suitable function, including those of the systems and methods described herein.

The controller 200 (e.g., processor 202) may be configured to execute cote stored in the memory. The code is configured to provide the features of the controller and systems described herein. In an embodiment, the processor 202 includes one or more devices selected from high-performance computing (HPC) systems including high-performance cores, microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on computer-executable instructions residing in memory 204. Memory 204 can include non-volatile storage configured to store compiled and/or interpreted from computer programs created using a variety of programming languages and/or technologies, including, without limitation, and either alone or in combination, Java, C, C++, C#, Objective C, Fortran, Pascal, Java Script, Python, Perl, and PL/SQL.

The controller 200 may receive one or more signals from various measurement devices or sensors 206 indicating sensed or measured characteristics of the vehicle 100 and its external environment. The sensors 206 may include any suitable sensors, measurement devices, and/or other suitable mechanisms. For example, the sensors 206 may include one or more motor position sensor or devices, one or more image capturing sensors or devices, one or more audio capturing sensors or devices, other suitable sensors or devices, or a combination thereof. In an embodiment, the sensors 206 include an image sensor such as a camera, LIDAR, RADAR, infrared sensor, and the like, wherein the sensors 206 are configured to generate image data. In another embodiment, the image data relied upon includes an HD map received from storage and/or currently being updated as the vehicle drives via the sensors 206. The one or more signals may indicate a vehicle speed, image data corresponding to an environment or scene external to the vehicle 100, audio data associated with the environment or other aspects of the vehicle 100, other suitable information, or a combination thereof.

In some embodiments, the controller 200 may use an artificial intelligence engine 08 configured to use at least one machine learning model to perform the embodiments of systems and methods described herein. The artificial intelligence engine may include any suitable artificial intelligence engine and may be disposed within the vehicle 100 or remotely located from the vehicle 100, such as in a cloud computing device or other suitable remotely located computing device. The artificial intelligence engine may use one or more machine learning models to perform at least one of the embodiments disclosed herein. For example, the machine learning models may be configured to, via the processor 202, process the image data to determine the presence of a parking spot, whether or not the parking spot is occupied by another vehicle or instead available, and classify another vehicle as having an intention to park, as will be described further below. The controller 200 may include a training engine capable of generating the one or more machine learning models. The machine learning models may include any suitable model, including, but not limited to, a convolutional neural network. The machine learning model may be trained using data that comprises images of individuals or groups of individuals in various environments. Various similarity techniques may be used to remove duplicate data. Additionally, or alternatively, the images may be fine-tuned to remove any undesirable samples. Additionally, or alternatively, various post-estimation techniques may be used to filter samples which contain a full body of individuals or groups of individuals in the images. The machine learning model, having been trained using the training data, may be configured to classify a leading vehicle as having an intention to park based on a plurality of images provided as input to the machine learning model. The machine learning model may output a commanded propulsion control to maneuver the vehicle based on the leading vehicle having the intention to park.

It should be understood that the controller controlling one or more aspects of the vehicle 100 may include the controller providing instructions to one or more other controllers of the vehicle 100 and/or providing an output to a display of the vehicle 100 or other suitable display for an operator of the vehicle (e.g., such that the operator of the vehicle 100 controls the one or more aspects of the vehicle 100 based on the instructions).

Driving autonomously (or at least partially autonomously) in a dense urban environment can be a complicated task. In some situations, the vehicle performing the autonomous or semi-autonomous functions (hereinafter referred to as the EGO vehicle or the first vehicle) performs an ACC based on a forward vehicle (hereinafter referred to as a leading vehicle, second vehicle, or subject vehicle) by constantly maintaining a safe distance from the forward vehicle. In situations where the forward vehicle is looking for a parking spot and finally finds one, the forward vehicle usually triggers its blinker and performs a backward parking maneuver to park in the available spot. In the meantime, the EGO vehicle continues to perform an ACC event based on the forward vehicle, which might cause the EGO vehicle to creep into a location adjacent the available parking spot, thereby blocking the forward vehicle from parking in the available parking spot.

Figure 3A:
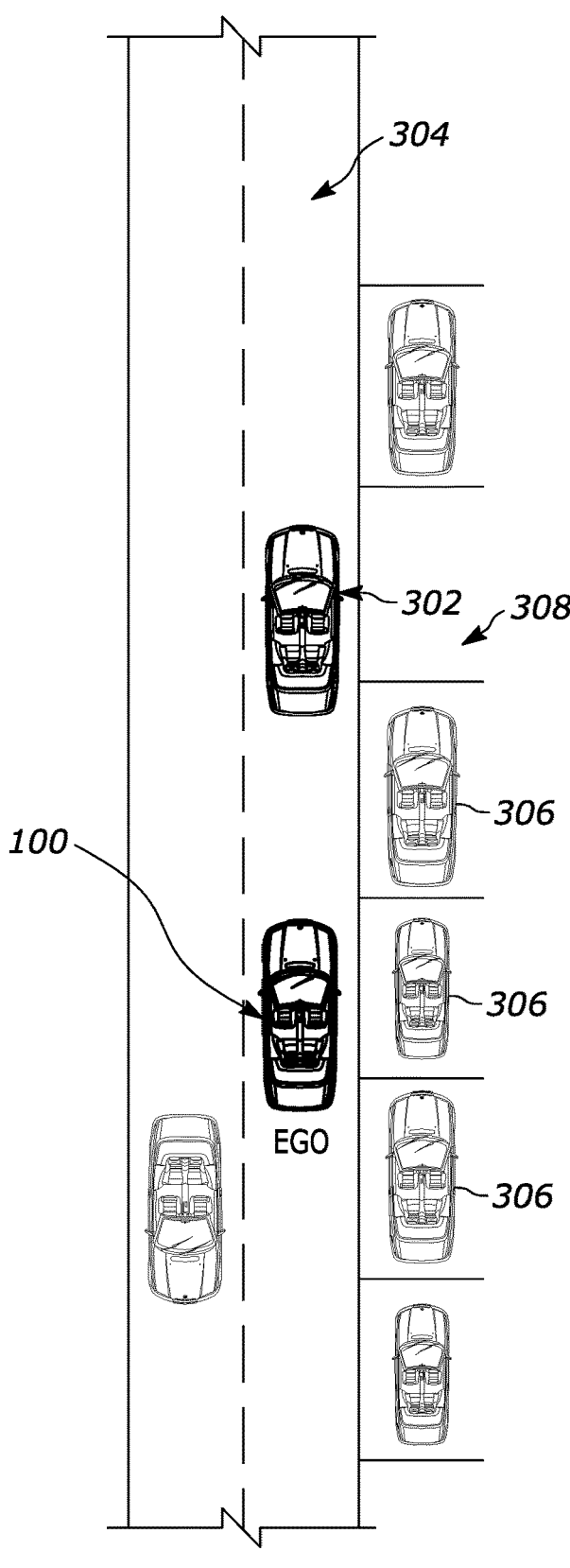
FIGS. 3A-3B are overhead schematics of a first vehicle (EGO vehicle) approaching a second vehicle (forward vehicle) that is attempting to park by reversing into a parking space, and interfering with the second vehicle's ability to park.
Figure 3B:
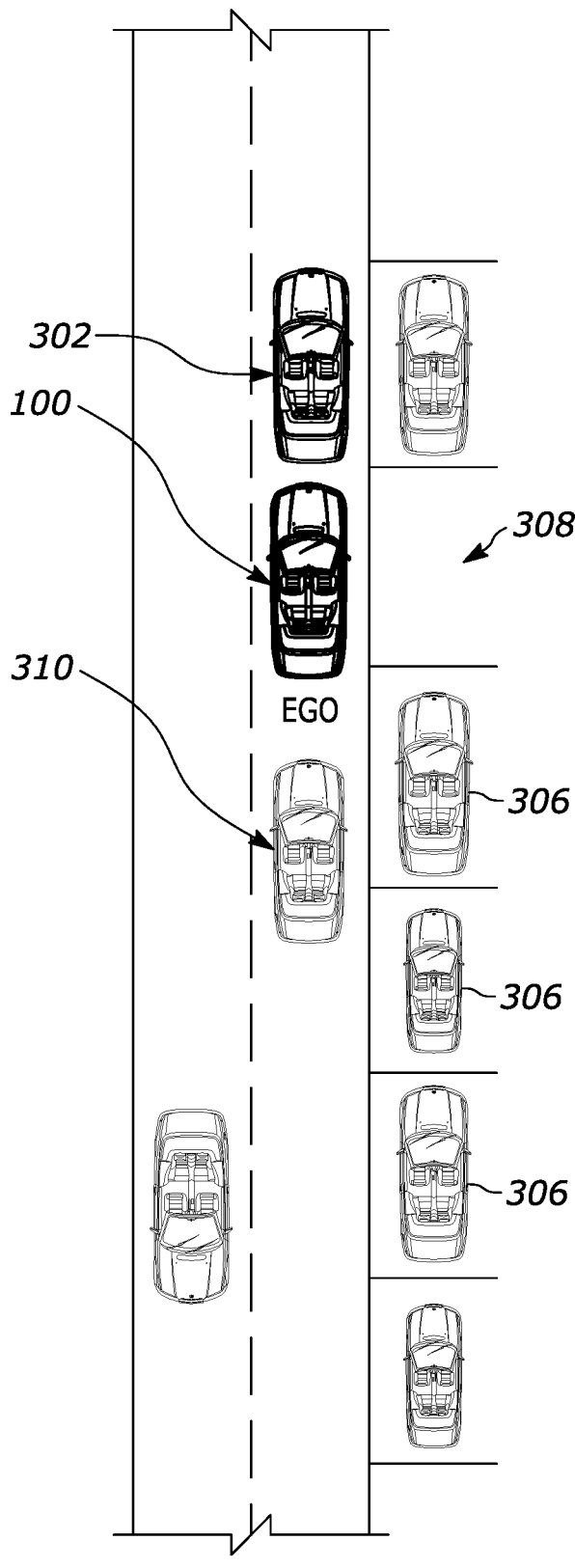

FIGS. 3A-3B illustrate this conundrum, in which FIG. 3A shows an overhead schematic of an EGO vehicle (such as vehicle 100) trailing behind a second vehicle (e.g., forward vehicle) 302. As shown here, the forward vehicle 302 drives along a roadway lane 304 and passes by a plurality of parked vehicles 306 until the vehicle 302 (or its driver) sees or detects an open or available parking spot 308. In order to park in the available parking space 308, the forward vehicle 302 might drive slightly passed the parking spot 308, as shown in FIG. 3B, in order to back into the parking space 308. However, as the EGO vehicle 100 is performing an ACC event and automatically driving close to the forward vehicle 302, the EGO vehicle 100 might block the available parking space 308, thus inhibiting the forward vehicle 302 from reversing into the available parking space 308. This can be even more troublesome of another vehicle 310 trailing the EGO vehicle 100 approaches the EGO vehicle 100, thereby inhibiting the EGO vehicle from reversing to get out of the way of the forward vehicle 302.

Therefore according to various embodiments disclosed herein, systems and methods are provided for a vehicle (e.g., EGO vehicle 100) equipped with autonomous or semi-autonomous features to recognize when the leading vehicle 302 is intending to park, and reacting accordingly. For example, the vehicle 100 can process image data originating from the vehicle's camera(s), determine that the forward vehicle 302 is exhibiting behavior that indicates the forward vehicle 302 is intending to park, and act accordingly. The actions taken by the vehicle 100 in response to determining that the forward vehicle 302 has an intention to park can include moving into another roadway lane, maintaining a far enough distance from the forward vehicle 302 to allow the forward vehicle 302 to park in the available parking space 308, and/or stopping at a location before reaching the available parking space 308.

Figure 4A:
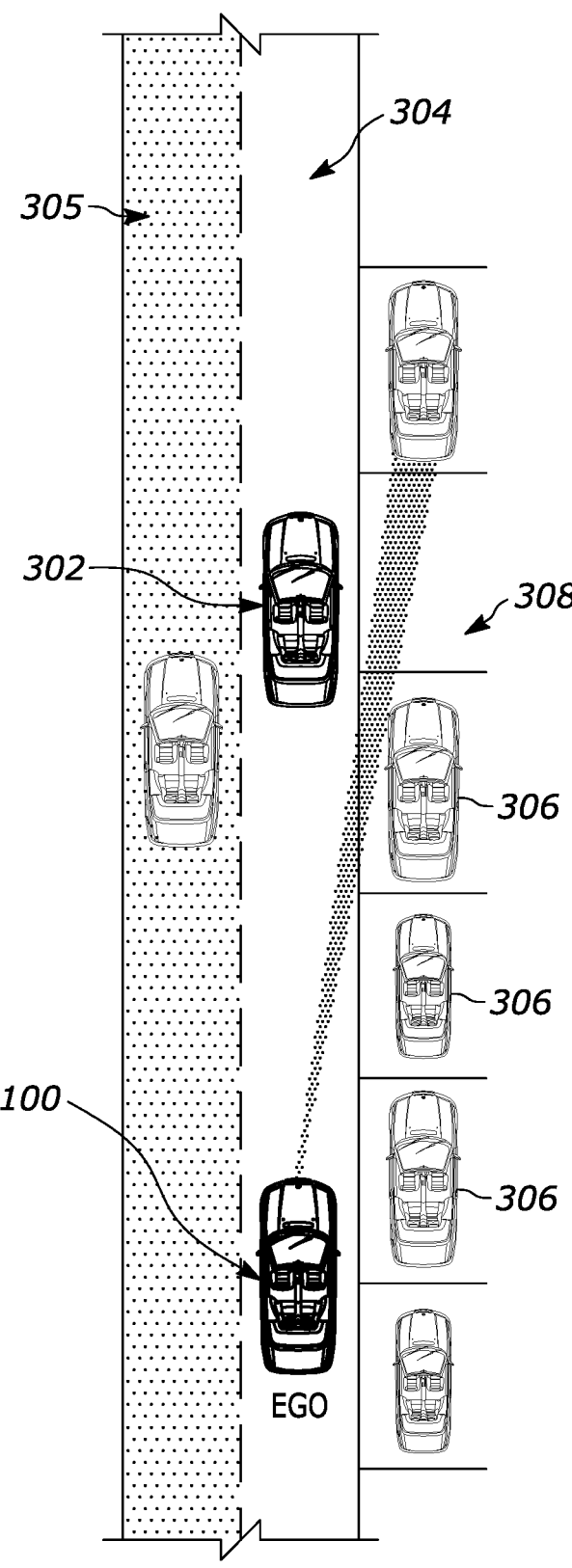
FIGS. 4A-4B are overhead schematics of the first vehicle recognizing the second vehicle is attempting to park and taking appropriate action according to an embodiment.
Figure 4B:
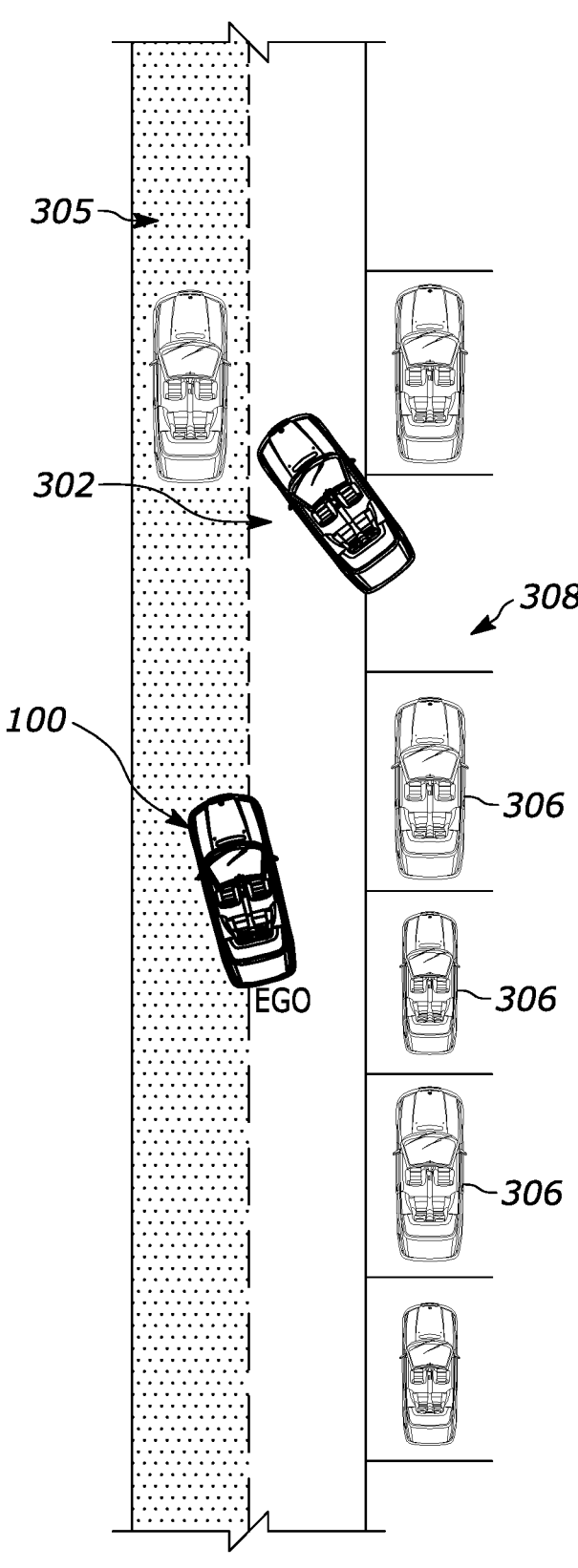

FIGS. 4A-4B illustrate an overhead schematic of one embodiment of a disclosed invention herein. Here, the EGO vehicle 100 first relies on the image data to determine that the forward vehicle 302 has an intention to park. In an embodiment, the vehicle sensors 206 (e.g., camera, LIDAR, RADAR, etc.) on the EGO vehicle 100 can be used in conjunction with an associated controller 200 to sense various properties about the forward vehicle 302. This can include, for example, determining the speed of the forward vehicle 302, the location of the forward vehicle 302 being in a roadway lane 304 adjacent a plurality of parking spots, and/or the presence of an available parking spot 308. This can also include, for example, determining that the vehicle is going a low speed, such as a speed well below the designated speed limit of that roadway. A speed threshold may be set that is a function of the speed limit (e.g., 20% of the speed limit), or is set irrespective of the speed limit (for example, the speed threshold can be two miles per hour, five miles per hour, 10 miles per hour, etc.). This can also include, for example, an acceleration and deceleration pattern of the vehicle; for example, the vehicle sharply accelerating and decelerating multiple times over time, which could resemble the driver stopping and starting as he/she looks for an available parking spot. Any of the above sensed qualities about the forward vehicle 302 can be used at least in part to determine that the forward vehicle 302 is having an intention to park. The controller can classify the forward vehicle 302 as having the intention to park unless or until one or more of the above-described qualities are absent.

In one embodiment, the controller 200 classifies the forward vehicle 302 as having an intention to park based at least upon (1) the forward vehicle traveling in a roadway lane that is adjacent to the plurality of parking spaces (e.g., roadway lane 304) and (2) the speed of the forward vehicle being less than a speed threshold, such as one described above. If both criteria are true, the controller can flag the forward vehicle 302 as having an intention to park.

It should be understood that processor 202 may determine the presence and location of the parking spots based on, for example, image processing techniques that allow the determination of parking lines painted on the ground at spaced-apart intervals. The processor 202 may also determine or identify one of the parking spots as being an available parking spot 308 (e.g., not occupied and available for parking) based upon no vehicle or other object being detected within the parking space 308. In other embodiments, the processor 202 may rely upon data provided via an HD map in order to identify a parking spot, and then determine whether or not that parking spot is available based upon the processing of the image data generated from the sensor 206 onboard the vehicle, indicating no vehicle being present in the parking spot. Techniques disclosed in U.S. patent application Ser. No. 18/310,837, filed May 2, 2023 titled METHODS AND SYSTEMS FOR ASSISTING A VEHICLE TO PARK BASED ON REAL-TIME PARKING SPOT AVAILABILITY DATA (which is hereby incorporated by reference in its entirety) can be utilized for image processing, object detection, and the determination of available parking spots, for example. The processor 202 may rely upon GPS and mapping having information about the road's layout, including lane lines and parking lines. The processor 202 may also employ sensor fusion, combining data from multiple sensors to create a more complete and accurate understanding of the vehicle's environment, including the lane lines and parking spot lines.

Once the controller 200 has classified the forward vehicle 302 as having an intention to park, the controller 200 may command various actions to be taken by the EGO vehicle 100. The controller 200 may issue various propulsion controls or commands to maneuver the vehicle. This may include an activation or alteration of the vehicle's engine, battery, steering wheel, driving wheels, transmission, and the like as described above with reference to FIGS. 1-2.

In one example of a commanded propulsion control, the controller 200 commands the EGO vehicle 100 to change lanes. Of course, this action should only be taken if it is safe and legal to do so. Therefore, in one embodiment, the controller 200 can also process the image data to determine if an adjacent lane is present, with that adjacent lane having the same direction of travel as the lane in which the EGO vehicle 100 currently occupies. This is shown in FIG. 4B, as one example. Here, once the EGO vehicle 100 (or its controller 200) determines the roadway lane 305 adjacent to the currently-traveled roadway lane 304 does not have any vehicles or objects in it in the vicinity of the vehicle 100, and that the roadway lane 305 has the same direction of travel as roadway lane 304. The determination of the direction of travel of each roadway lane can be made utilizing conventional image processing techniques such as determining the location and type of lane dividers on the road and their associated meaning, or relying on a map (e.g., HD Map) equipped with information gathered from other vehicles that have traveled that roadway.

As shown in FIG. 4B, once the EGO vehicle 100 has determined that the forward vehicle 302 has an intention to park, the controller 200 determines the second roadway lane 305 has the same direction of travel as the first roadway lane 304 and no objects would interfere with a safe lane change maneuver. Thereafter, the controller 200 commands the EGO vehicle 100 to switch from the roadway lane 304 into the adjacent roadway lane 305. This moves the EGO vehicle 100 out of the way of the forward vehicle 302 to allow the forward vehicle 302 to park in the available parking space 308, and also allows the EGO vehicle 100 to continue traveling without having to wait until the forward vehicle 302 is parked first.

Figure 4C:
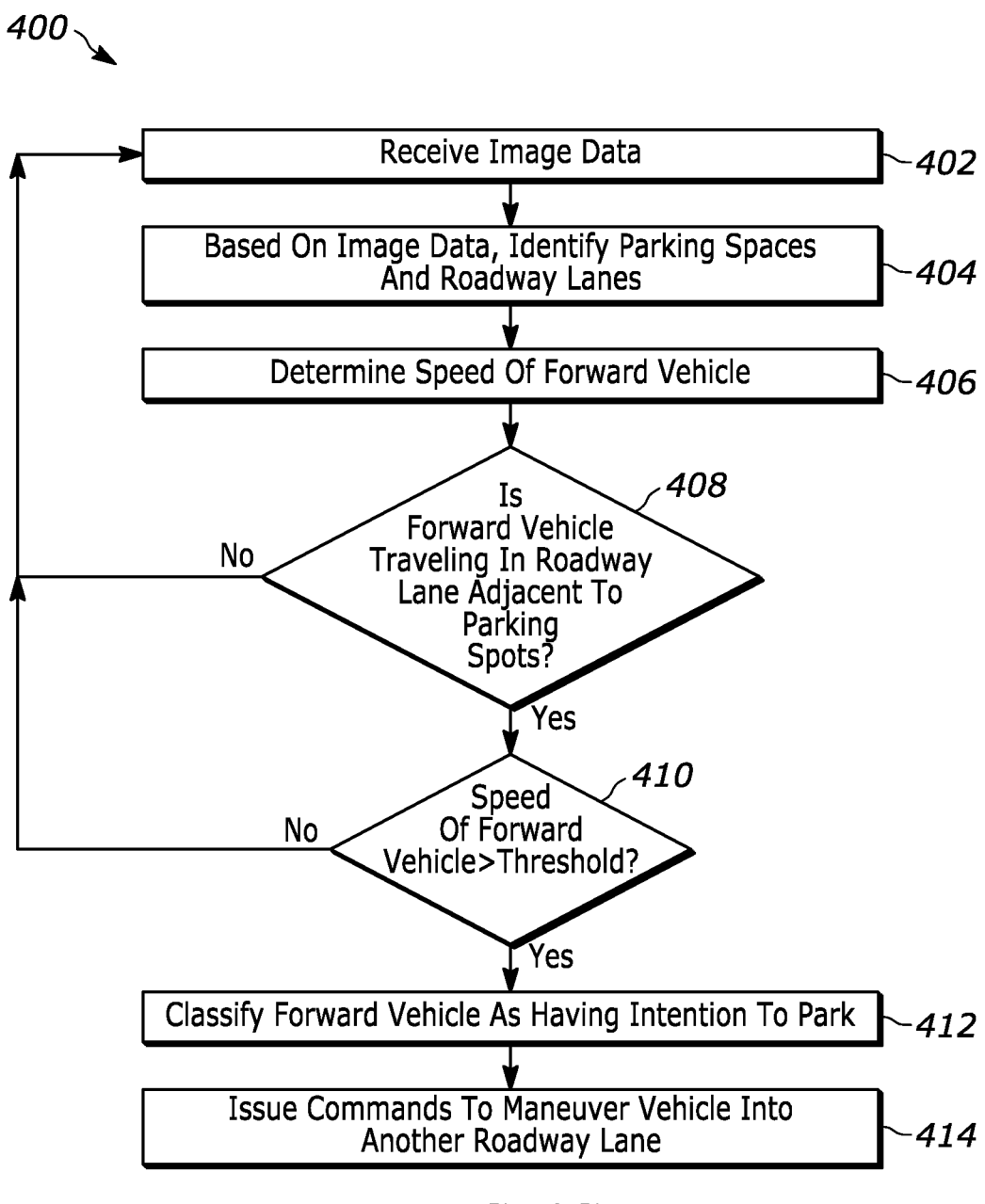
FIG. 4C is a flow chart of a method associated therewith.

In view of this embodiment, FIG. 4C illustrates a flow chart of a method 400 of autonomously controlling a first vehicle 100 when a forward vehicle 302 intends to park, according to one embodiment. The steps may be implemented in the order shown. In some alternative implementations, the functions noted in the flow chart blocks can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flow chart illustration, and combinations of blocks in the block diagrams and/or flow chart illustration, can be implemented by special purpose hardware-based systems that perform the specified functions or acts or carry out combinations of special purpose hardware and computer instructions. For example, the method may be carried out by controller 200 of EGO vehicle 100.

At 402, the controller receives image data. The image data may be generated by the sensor 206 onboard the vehicle 100. The sensor 206 may be a camera, LIDAR, RADAR, or other types of sensors described herein, and the data generated by that sensor can be generally referred to as image data. Alternatively, the image data may be received from an off-board server (e.g., cloud) corresponding with the scene or environment outside of the vehicle 100. The controller is programmed to utilize the image processing techniques described herein to automatically control and/or maneuver the vehicle.

For example, at 404 the controller processes the image data in order to identify parking spaces and roadway lanes and/or lines. The controller can also identify a forward vehicle (e.g., vehicle 300) ahead of the vehicle 100 based on the image data. At 406, the controller determines the speed of the forward vehicle. This can be based on the image data, and/or other data from other sensors. For example, an ultrasonic sensor or other type of short-range sensor can be used to determine the relative speed of the forward vehicle 300.

At 408, the controller determines whether the forward vehicle 300 is traveling in a roadway lane that is adjacent to identified parking spots. Again, this can be performed based on the processing of the image data as described herein. Likewise, at 410, the controller evaluates whether the determined speed of the forward vehicle exceeds a threshold. As described above, the speed threshold can be a function of the speed limit of this particular roadway, or can be some set speed limit (e.g., below 10 miles per hour) that might be associated with a vehicle intending to park now or in the immediate future. If the outcome of both 408 and 410 is yes, then at 412 the controller classifies the forward vehicle 300 as having an intention to park. If the outcome of either 408 or 410 is no, then the method can return to 402 where the controller receives the image data.

Once the forward vehicle 300 has been classified as having the intention to park, at 414 the controller can issue commands to maneuver the vehicle 100 into another roadway lane, if it is safe to do so. This might include issuing acceleration, deceleration, and/or steering commands to move the vehicle from a first roadway lane 304 to an adjacent roadway lane 305, as illustrated in FIGS. 4A-4B. Other necessary conditions might also need to be met for this command to be issued, such as a determination that the adjacent roadway lane 305 has the same direction of travel as the roadway lane 304, and there are no objects or vehicles in the adjacent roadway lane 305 that would impede such a maneuver.

Figure 5A:
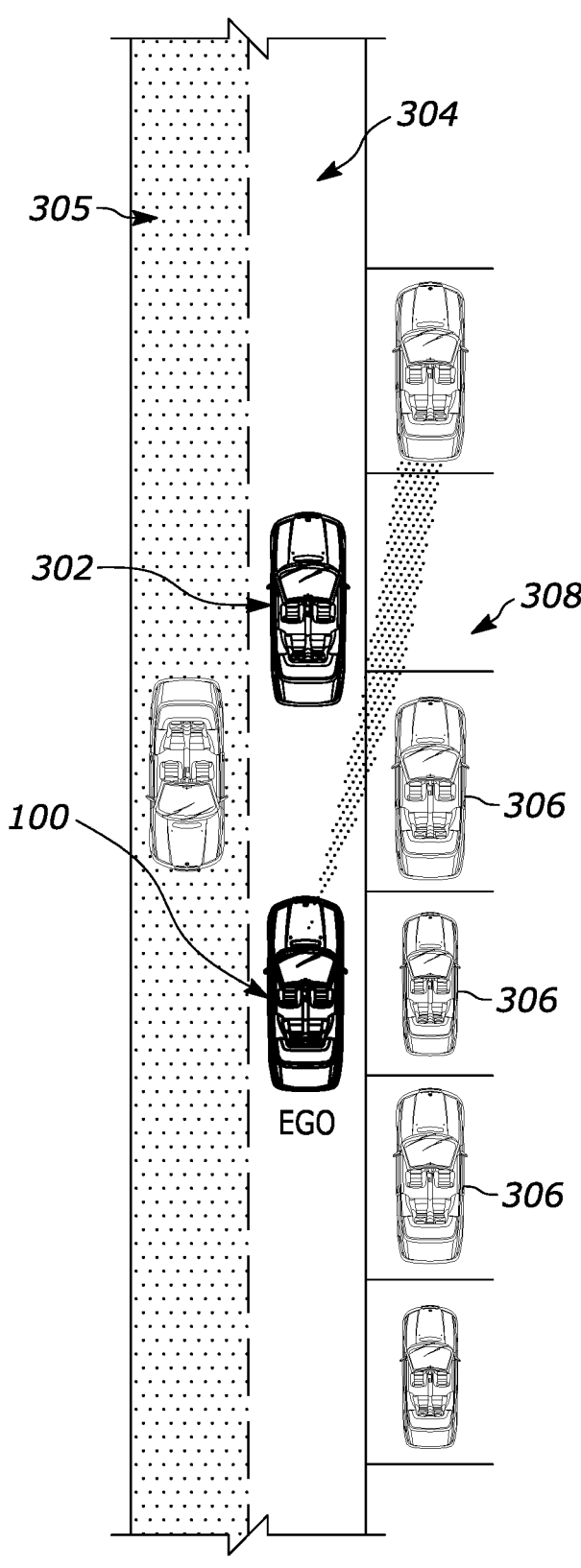
FIGS. 5A-5B are overhead schematics of the first vehicle recognizing the second vehicle is attempting to park and taking an appropriate action according to another embodiment.
Figure 5B:
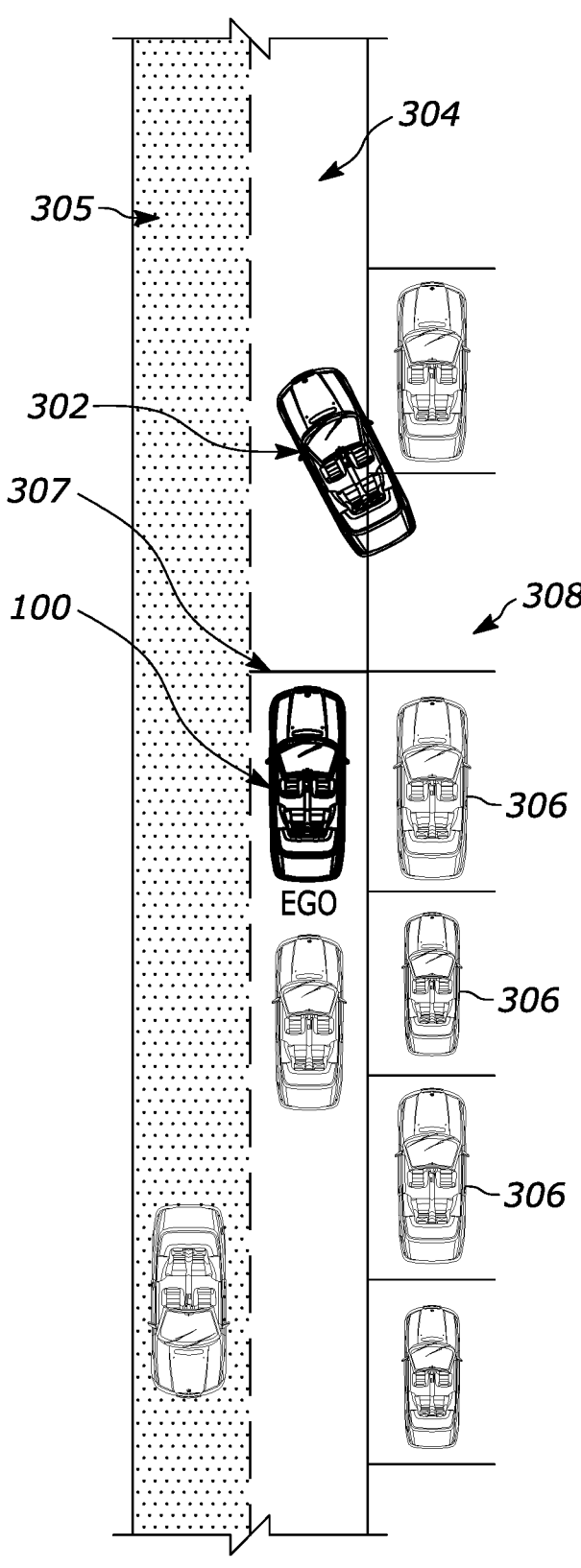

FIGS. 5A-5B illustrate an overhead schematic of another embodiment of a disclosed invention herein. Here, the EGO vehicle 100 once again relies on the image data to determine that the forward vehicle 302 has an intention to park. The roadway lanes/lines and parking spots can be detected and identified similar as that described above, along with the presence of a forward vehicle 302 ahead of the EGO vehicle 100, the speed of the forward vehicle 302, and the like. Also similar to previous embodiments, the controller 200 of the EGO vehicle 100 classifies the forward vehicle 302 as having an intention to park based at least upon (1) the forward vehicle traveling in a roadway lane that is adjacent to the plurality of parking spaces (e.g., roadway lane 304) and (2) the speed of the forward vehicle being less than a speed threshold, such as one described above. If both criteria are true, the controller can flag the forward vehicle 302 as having an intention to park.

However, in response to a determination of the forward vehicle 302 having an intention to park, different actions are taken in this embodiment than in the embodiment of FIG. 4. In particular, a virtual barrier 307 is created that defines a location that the EGO vehicle 100 must stop before. The virtual barrier 307 can be created at a location that is aligned with the beginning of the available parking space 308, for example, thus stopping the vehicle prior to the location of the available parking space 308 so as to not interfere with the forward vehicle 302 performing its parking maneuvering into the available parking space 308.

A decision to perform this action may be due to a determination that the adjacent roadway lane 305 has a direction of travel that is opposite to the roadway lane 304 in which the EGO vehicle 100 is traveling. In other words, because the adjacent roadway lane 305 should not be driven into by the EGO vehicle 100, the EGO vehicle 100 cannot legally (or safely) go around the forward vehicle 302 as was the case in FIG. 4. Instead, the EGO vehicle 100 should stop short of the available parking space 308, rather than continuing to travel close to the forward vehicle 302 as was the case in FIG. 3.

Figure 5C:
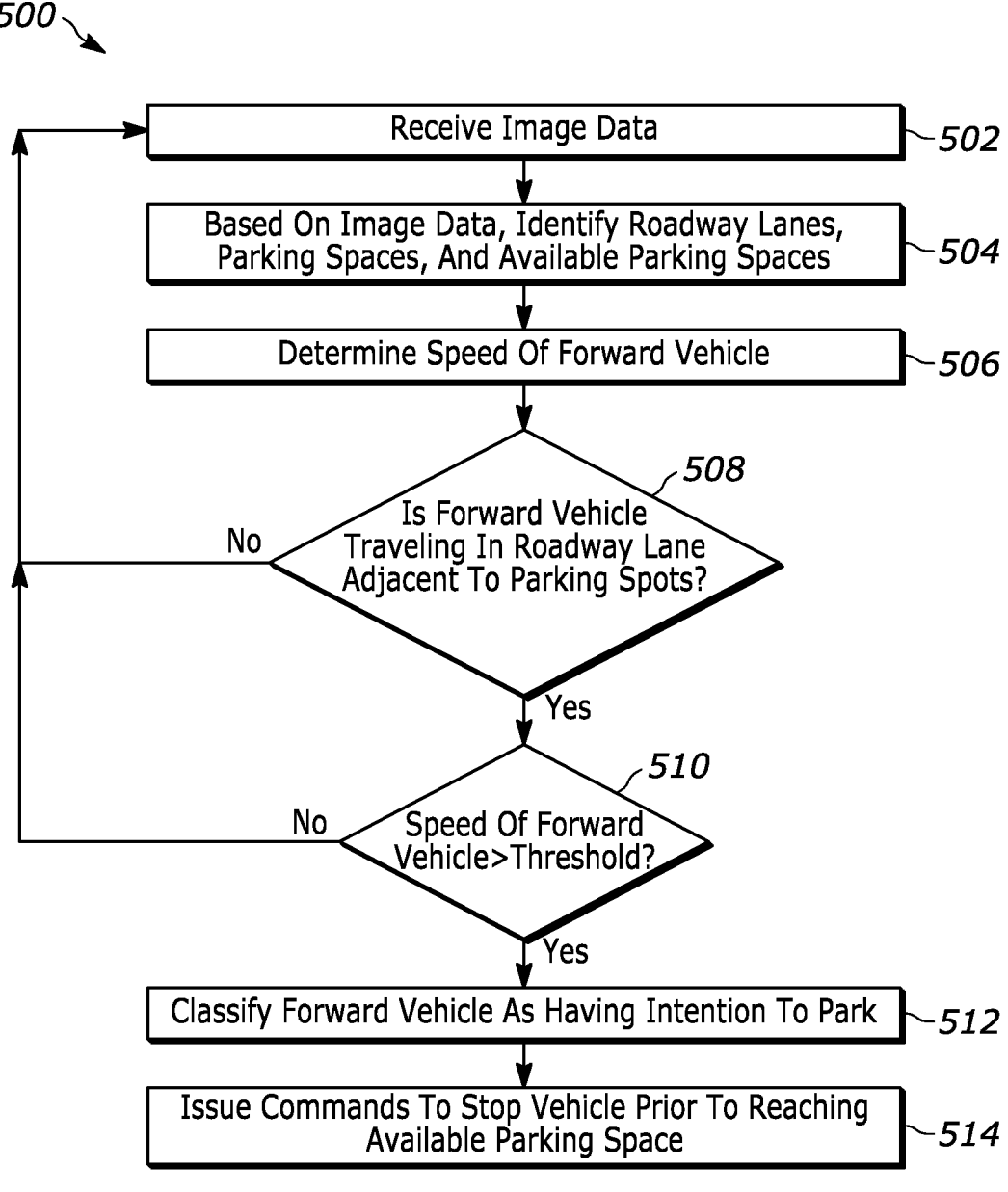
FIG. 5C is a flow chart of a method associated therewith.

In view of this embodiment, FIG. 5C illustrates a flow chart of a method 500 of autonomously controlling a first vehicle 100 when a forward vehicle 302 intends to park, according to one embodiment. Once again, the steps may be implemented in the order shown. In some alternative implementations, the functions noted in the flow chart blocks can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flow chart illustration, and combinations of blocks in the block diagrams and/or flow chart illustration, can be implemented by special purpose hardware-based systems that perform the specified functions or acts or carry out combinations of special purpose hardware and computer instructions. For example, the method may be carried out by controller 200 of EGO vehicle 100.

At 502, similar actions are taken like at 402 in which the controller 200 receives image data. Then, based on processing the image data, at 504 the controller identifies roadway lanes, parking spaces, and available parking spaces. For example, the controller can identify the roadway lane 304 that the vehicle is traveling in, and an adjacent roadway lane 305, along with a plurality of parking spaces adjacent the roadway lane 304. The controller can also identify the presence of vehicles, such as parked vehicles 306 that are parked within the identified parking spaces. Likewise, the controller 200 can also identify available parking spaces, i.e. one or more of the parking spaces that do not have a vehicle 306 occupying it. Those available parking spaces 308 can be marked or flagged as available, and can remain marked or flagged as such until a vehicle or other object enters the associated parking space 308.

At 506, the controller determines the speed of the forward vehicle 300 similar to 406. Then, the controller determines whether or not the vehicle has an intention to park, and if so, classifies it as such. This is performed at 508, 510, and 512 which are similar to 408, 410 and 412 described above. Like in the method of FIG. 4C, if the outcome of either 508 or 510 is no, then the method can return to 502 where the controller receives the image data.

Once the forward vehicle 300 has been classified as having the intention to park, at 514 the controller can issue commands (e.g., braking commands) to stop the vehicle 100 before reaching the available parking space 308. In an embodiment, a virtual object is placed in an area adjacent the available parking space 308, such as at a location within the roadway lane 304 and aligned with the closest parking line of the available parking space 308 as shown at 307 in FIG. 5B. In another embodiment, the virtual object 307 is placed at a location closer to the vehicle 100 than shown in FIG. 5B in order to maximize the space the vehicle 100 provides to the forward vehicle 302 to allow the forward vehicle 302 to safely park in the parking space 308.

Placement of the virtual object 307 is one way of automatically stopping the vehicle 100 before arriving at the available parking space 308. In other embodiments, the controller 200 simply commands the vehicle to brake such that it does not approach a location aligned with the parking lines that define the available parking space 308. In other words, the system can be configured such that it is not necessary to proactively place a virtual object in the scene to stop the vehicle 100.

The controller 200 can maintain the vehicle 100 stopped in the first roadway lane 304 until the forward vehicle has maneuvered out of the first roadway lane 304 and into the available parking space 308. Once safe, the controller 200 can command the vehicle 100 to begin traveling again, e.g. by issuing appropriate acceleration commands.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A system for autonomously controlling a first vehicle when a forward vehicle intends to park, the system comprising:

an image sensor mounted to the first vehicle and configured to generate image data associated with a scene surrounding the first vehicle, wherein the scene includes the forward vehicle located ahead of the first vehicle; and a processor mounted to the first vehicle and communicatively coupled to the image sensor, wherein the processor is programmed to:

process the image data to identify a plurality of parking spaces, a first roadway lane adjacent to the plurality of parking spaces, and a second roadway lane adjacent to the first roadway lane;

process the image data to determine a speed of the forward vehicle;

classify the forward vehicle as having an intention to park based upon at least (1) the forward vehicle traveling in the first roadway lane and (2) the speed of the forward vehicle being less than a speed threshold; and cause the first vehicle to maneuver out of the first roadway lane and into the second roadway lane in response to the forward vehicle being classified as having the intention to park.

2. The system of claim 1, wherein the processor is further programmed to:

process the image data to identify one of the plurality of parking spaces as an available parking space;

prohibit the first vehicle from maneuvering out of the first roadway lane and into the second roadway lane in response to either (1) the second roadway lane having a direction of travel opposite the first roadway lane or (2) another vehicle being present in the second roadway lane in the scene; and cause the first vehicle to stop before reaching the available parking space until the forward vehicle has maneuvered out of the first roadway lane and into the available parking space.

3. The system of claim 1, wherein the speed threshold is dependent upon, and less than, a speed limit associated with the first and second roadway lanes.

4. The system of claim 1, wherein the processor is programmed to classify the forward vehicle as having the intention to park based additionally upon a pattern of acceleration or deceleration of the forward vehicle.

5. The system of claim 1, wherein the processor is programmed to classify the forward vehicle as having the intention to park based additionally upon the forward vehicle maintaining its position in the first roadway lane.

6. The system of claim 1, wherein the image sensor includes at least one of a camera, lidar sensor, radar sensor, or ultrasonic sensor.

7. The system of claim 1, wherein the processor is further programmed to rely on a HD Map in determining that the forward vehicle is traveling in the first roadway lane adjacent to the plurality of parking spaces.

8. A system for autonomously controlling a first vehicle when a forward vehicle intends to park, the system comprising:

an image sensor mounted to the first vehicle and configured to generate image data associated with a scene surrounding the first vehicle, wherein the scene includes the forward vehicle located ahead of the first vehicle; and a processor mounted to the first vehicle and communicatively coupled to the image sensor, wherein the processor is programmed to:

process the image data to identify a plurality of parking spaces, a first roadway lane adjacent to the plurality of parking spaces, and a second roadway lane adjacent to the first roadway lane, wherein one of the plurality of parking spaces is identified as an available parking space;

process the image data to determine a speed of the forward vehicle;

classify the forward vehicle as having an intention to park based upon at least (1) the forward vehicle traveling in the first roadway lane and (2) the speed of the forward vehicle being less than a speed threshold; and cause the first vehicle to stop before reaching the available parking space based upon the forward vehicle being classified as having the intention to park.

9. The system of claim 8, wherein the processor is further programmed to cause the first vehicle to remain stopped until the forward vehicle has maneuvered out of the first roadway lane and into the available parking space.

10. The system of claim 8, wherein the processor is further programmed to prohibit the first vehicle from maneuvering out of the first roadway lane and into the second roadway lane in response to either (1) the second roadway lane having a direction of travel opposite the first roadway lane or (2) another vehicle being present in the second roadway lane in the scene.

11. The system of claim 8, wherein the processor is further programmed to cause the first vehicle to maneuver out of the first roadway lane and into the second roadway lane in response to the forward vehicle being classified as having the intention to park.

12. The system of claim 8, wherein the speed threshold is dependent upon, and less than, a speed limit associated with the first and second roadway lanes.

13. The system of claim 8, wherein the processor is programmed to classify the forward vehicle as having the intention to park based additionally upon a pattern of acceleration or deceleration of the forward vehicle.

14. The system of claim 8, wherein the processor is programmed to classify the forward vehicle as having the intention to park based additionally upon the forward vehicle maintaining its position in the first roadway lane.

15. The system of claim 8, wherein the image sensor includes at least one of a camera, lidar sensor, radar sensor, or ultrasonic sensor.

16. A method for autonomously controlling a first vehicle when a forward vehicle intends to park, the method comprising:

receiving image data from an image sensor mounted on a first vehicle, wherein the image data is associated with a scene surrounding the first vehicle, and wherein the scene includes the forward vehicle located ahead of the first vehicle;

processing the image data to identify a plurality of parking spaces, a first roadway lane adjacent to the plurality of parking spaces, and a second roadway lane adjacent to the first roadway lane;

determining a speed of the forward vehicle based on the image data;

classifying the forward vehicle as having an intention to park based upon at least (1) the forward vehicle traveling in the first roadway lane and (2) the speed of the forward vehicle being less than a speed threshold; and maneuvering autonomously the first vehicle out of the first roadway lane and into the second roadway lane in response to the first vehicle being classified as having the intention to park.

17. The method of claim 16, further comprising:

processing the image data to identify one of the plurality of parking spaces as an available parking space;

prohibiting the first vehicle from maneuvering out of the first roadway lane and into the second roadway lane in response to either (1) the second roadway lane having a direction of travel opposite the first roadway lane or (2) another vehicle being present in the second roadway lane in the scene; and stopping autonomously the first vehicle before the first vehicle reaches the available parking space until the forward vehicle has maneuvered out of the first roadway and into the available parking space.

18. The method of claim 16, wherein the classifying the forward vehicle as having the intention to park is further based on a pattern of acceleration or deceleration of the forward vehicle.

19. The method of claim 16, wherein the classifying the forward vehicle as having the intention to park is further based on a turn signal being active on the forward vehicle.

20. The method of claim 16, wherein the classifying the forward vehicle as having the intention to park is further based on the forward vehicle maintaining its position in the first roadway lane.

* * * * *